FREQUENCY MULTIPLIER

Filed July 11, 1957

Inventor:
Luther L. Genuit,
by [signature]
His Attorney.

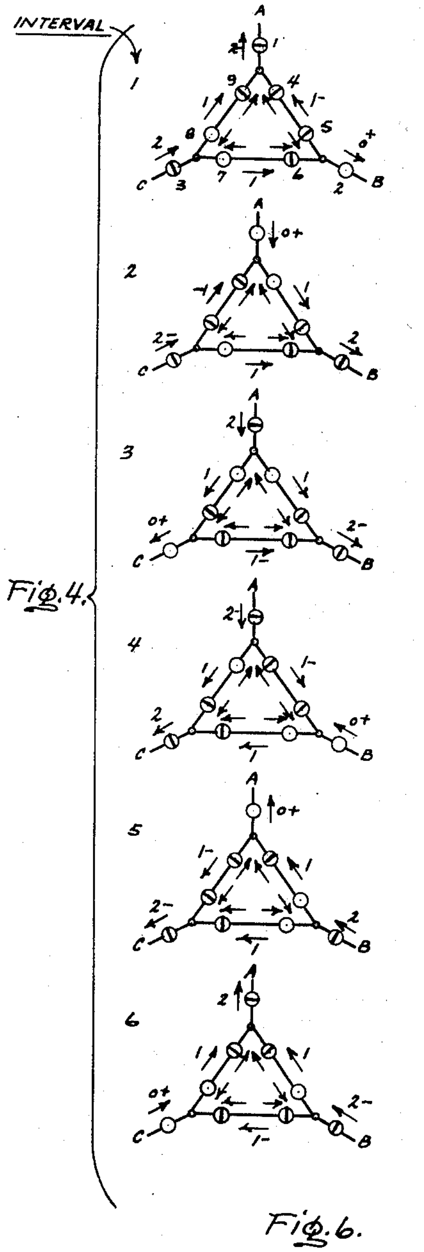
Fig. 4.
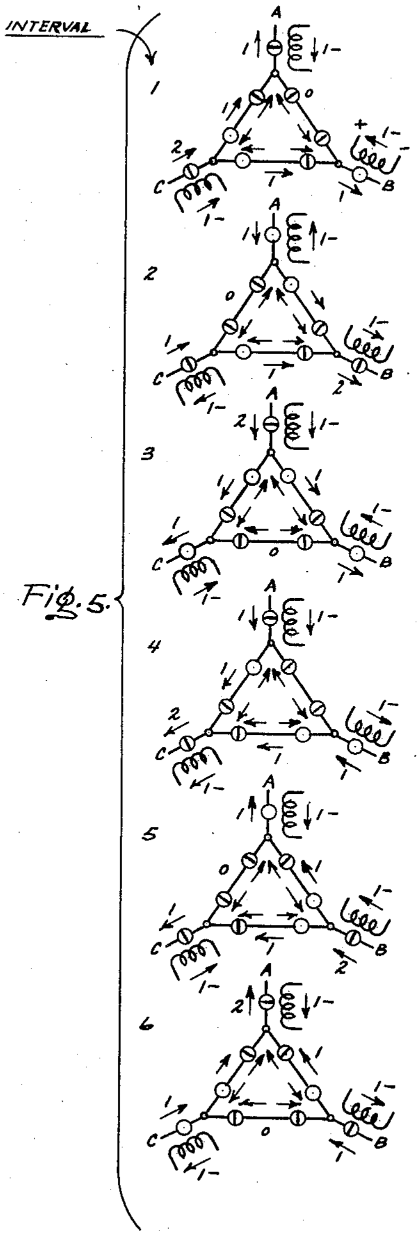
Fig. 5.
Fig. 6.
| INTERVAL | 1 | 2 | 3 | 4 | 5 | 6 |
|---|---|---|---|---|---|---|
| OUTPUT REACTOR | 2 | 1 | 3 | 2 | 1 | 3 |
| OUTPUT VOLTAGE | B-A | A-C | C-B | B-A | A-C | C-B |
| CURRENT LIMIT REACTOR | 7-8 | 4-7 | 4-9 | 6-9 | 5-6 | 5-8 |
| LOAD LIMIT REACTOR | 1 | 3 | 2 | 1 | 3 | 2 |
Inventor:
Luther L. Genuit,
by [signature]
His Attorney.

FREQUENCY MULTIPLIER

Filed July 11, 1957

Inventor:
Luther L. Genuit,
by [signature]
His Attorney.

June 23, 1959 L. L. GENUIT 2,892,142

FREQUENCY MULTIPLIER

Filed July 11, 1957 5 Sheets-Sheet 4

Inventor:
Luther L. Genuit,
by [signature]
His Attorney.

June 23, 1959

L. L. GENUIT 2,892,142

FREQUENCY MULTIPLIER

Filed July 11, 1957

5 Sheets-Sheet 5

| INTERVAL | 1 | 2 | 3 | 4 | 5 | 6 | 7 | 8 | 9 | 10 |
|---|---|---|---|---|---|---|---|---|---|---|
| OUTPUT REACTOR | 5 | 3 | 1 | 4 | 2 | 5 | 3 | 1 | 4 | 2 |
| OUTPUT VOLTAGE | E-C | C-A | A-D | D-B | B-E | A-C | C-A | A-D | D-B | B-E |
| CURRENT LIMIT REACTOR | 10-14 13-7 | 13-14 9-10 | 6-10 9-13 | 15-9 10-6 | 12-6 15-9 | 11-15 6-12 | 8-12 11-15 | 7-11 12-8 | 8-7 11-14 | 7-8 13-14 |
| LOAD LIMIT REACTOR | 3 | 1 | 4 | 2 | 5 | 3 | 1 | 4 | 2 | 5 |

| INTERVAL | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| OUTPUT REACTOR | 3 | 7 | 4 | 1 | 5 | 2 | 6 | 3 | 7 | 4 | 1 | 5 | 2 | 6 |
| OUTPUT VOLTAGE | C-G | G-D | D-A | A-E | E-B | B-F | F-C | C-G | G-D | D-A | A-E | E-B | B-F | F-G |
| CURRENT LIMIT REACTOR | 9-10-19 20-15-16 | 16-15-20 19-12-9 | 19-20-15 16-11-12 | 12-11-16 16-8-19 | 15-16-11 12-8-21 | 8-21-12 11-18-15 | 8-21-12 11-18-17 | 8-21-14 11-18-17 | 8-21-14 13-18-17 | 10-21-14 13-18-17 | 17-18-13 14-9-10 | 10-9-14 13-20-17 | 13-14-9 10-19-20 | 20-19-10 9-13-16 |
| LOAD LIMIT REACTOR | 7 | 4 | 1 | 5 | 2 | 6 | 3 | 7 | 4 | 1 | 5 | 2 | 6 | 3 |

Inventor:
Luther L. Genuit,
by [signature]
His Attorney.

United States Patent Office 2,892,142

Patented June 23, 1959

2,892,142

FREQUENCY MULTIPLIER

Luther L. Genuit, Fort Wayne, Ind., assignor to General Electric Company, a corporation of New York Application July 11, 1957, Serial No. 671,330

10 Claims. (Cl. 321—7)

This invention relates to frequency multipliers and more particularly to static magnetic devices for converting plural phase alternating current having a given frequency to single phase alternating current having a multiplied frequency.

There are numerous instances where it has been found desirable to operate alternating current electrical apparatus from a power source having a frequency considerably higher than that commonly provided by utilities, i.e., 60 cycles per second in the United States. It has been found for example that the operation of fluorescent lamps at higher frequencies permits the use of smaller and less expensive ballasts for each lamp and that the lamps produce higher lumens per watt than when operated at 60 cycles. Other desirable fields of application lie in the operation of other electrical apparatus, such as, magnetic amplifiers and induction motors.

Alternating current power at higher frequencies has in the past conventionally been provided by rotating equipment, such as, motor generator sets. All rotating equipment, however, inherently requires maintenance and therefore there is a demand for static, i.e., non-rotating devices for providing frequency multiplication. Static magnetic frequency multipliers utilizing various combinations of saturable core reactors have been proposed in the past, however, many of these multiplier circuits have required more than one stage to reach the desired output frequency and in addition, the prior static frequency multiplier circuits have not in general provided good overall utilization of the electrical components of the circuit. The utilization of the components of circuits of this type is measured by a "rating factor" which is the sum of the volt-ampere ratings of the reactors in the system divided by the output wattage of the system. The volt-ampere rating of a reactor winding is the product of the equivalent voltage rating and the R.M.S. full-load current for which the coil must be designed. The equivalent voltage rating is proportional to the maximum volt-second integral of the voltage wave supported by the winding and is expressed in terms of the R.M.S. value of the sinusoidal voltage at input frequency it must be capable of supporting without saturating the core.

It is therefore desirable to provide a static magnetic frequency multiplier which will in a single stage convert plural phase alternating current to single phase alternating current having a multiplied frequency and which has a rating factor which is improved over that provided by previous static frequency multipliers.

It is therefore an object of this invention to provide an improved single stage static magnetic frequency multiplier for converting plural phase alternating current having a given frequency into single phase alternating current having a multiplied frequency.

Another object of this invention is to provide an improved single stage static magnetic frequency multiplier having a lower rating factor than has heretofore been provided.

Further objects and advantages of this invention will become apparent by reference to the following description and the accompanying drawings, and the features of novelty which characterize this invention will be pointed out with particularity in the claims annexed to and forming a part of this specification.

I have found that plural phase alternating current having a given frequency can be converted into single phase alternating current having a frequency which is the input frequency multiplied by the number of phases by a circuit having a plurality of unbiased output saturable core reactors equal in number to the number of phases of the source with each such reactor having a primary winding and an output winding. One end of the primary winding of each of the output reactors is connected to a respective phase conductor of the source and the output windings are serially connected across the load. The other ends of the alternating current windings of the output reactors are connected by an internal neutral network, this network being formed of a plurality of biased current limiting reactors connected in a star-polygon configuration.

Thus, in accordance with one embodiment of this invention for converting three phase alternating current of a given frequency to single phase alternating current having a frequency three times the input frequency, three unbiased output saturable core reactors are provided, each having an alternating current winding and an output winding. One end of each of the alternating current windings is connected to a respective phase conductor of the source while the output windings are serially connected across the load. Three biased saturable core reactor current limiting circuits are provided, each having alternating current winding means and bias winding means, the alternating current winding means aiding a part and opposing a part of the bias winding means. The alternating current winding means of the current limiting saturable core reactor circuits are connected in delta to the respective other ends of the alternating current windings of the output reactors (a delta is for the purposes of this discussion, considered to be the simplest form of star-polygon). Circuit connections including a choke are provided for impressing a direct current bias voltage on the bias winding means of the current limiting saturable core reactor circuits, the bias winding means being arranged normally to saturate the respective cores of the current limiting saturable core reactors. The output reactors are arranged so that they are sequentially "dragged" from saturation in one direction to saturation in the opposite direction by the voltage appearing across their windings with all except one of the output reactors having its core instantaneously saturated. Thus, at any instant the unsaturated output reactor is functioning as a transformer inducing voltage pulses in the circuit of the output windings which provide the multiplied frequency output.

Figures 1, 2, 3A, 3B, 3C:
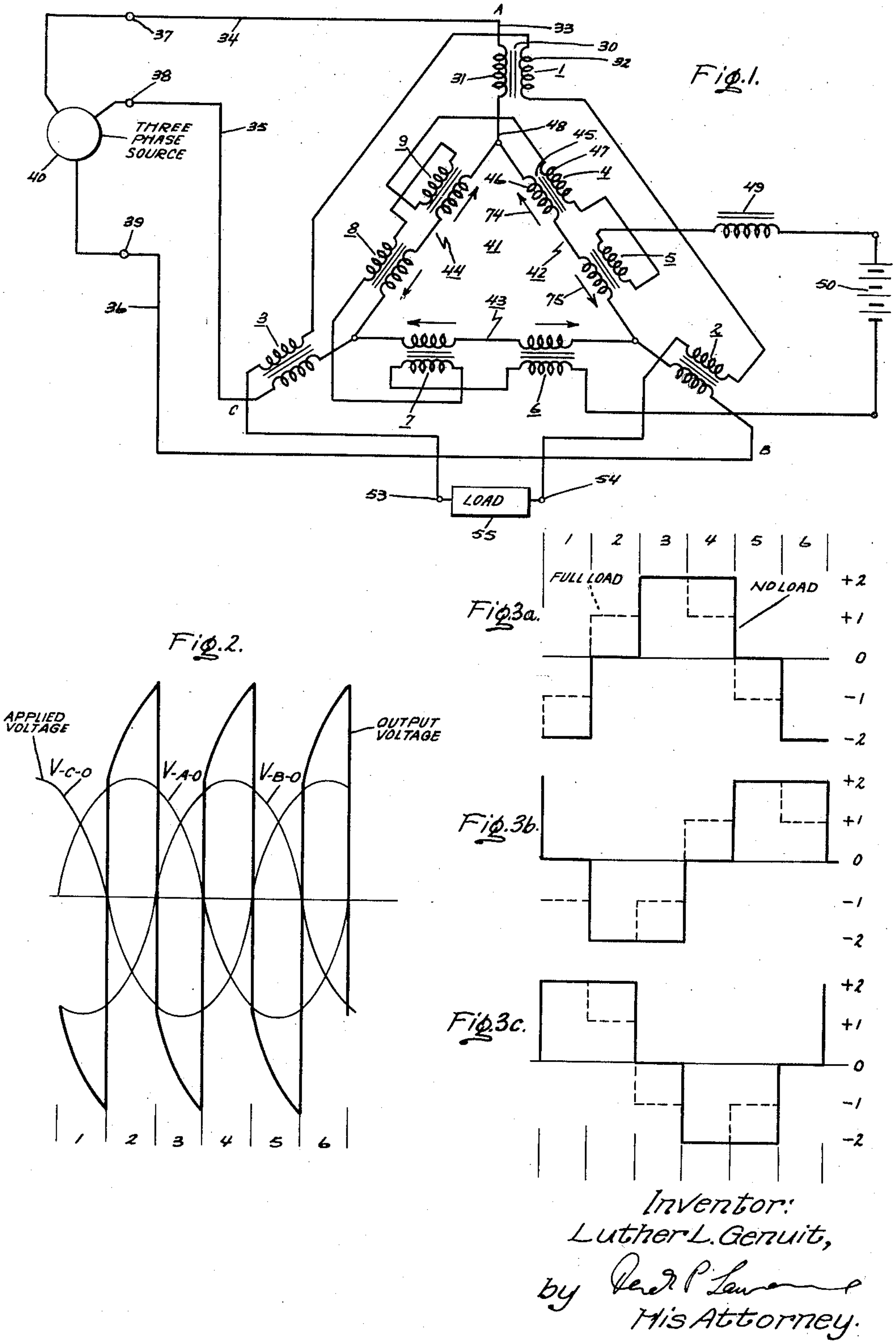
Fig. 1 is a schematic illustration of a frequency tripler embodying my invention.
Fig. 2 is an illustration of the phase relationship of the input and output voltages of the tripler circuit of Fig. 1.
Figures 7, 8:
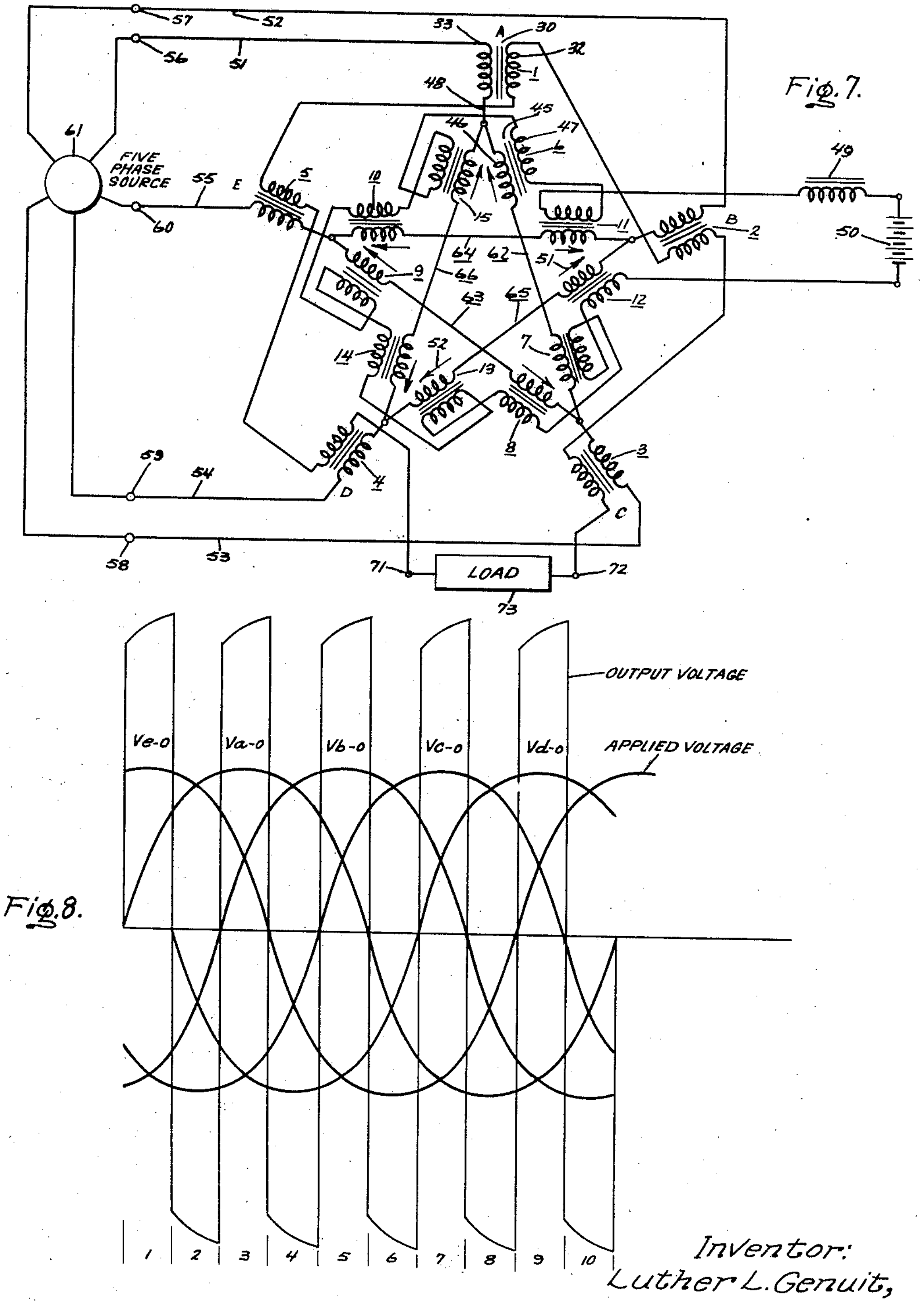
Figure 9:
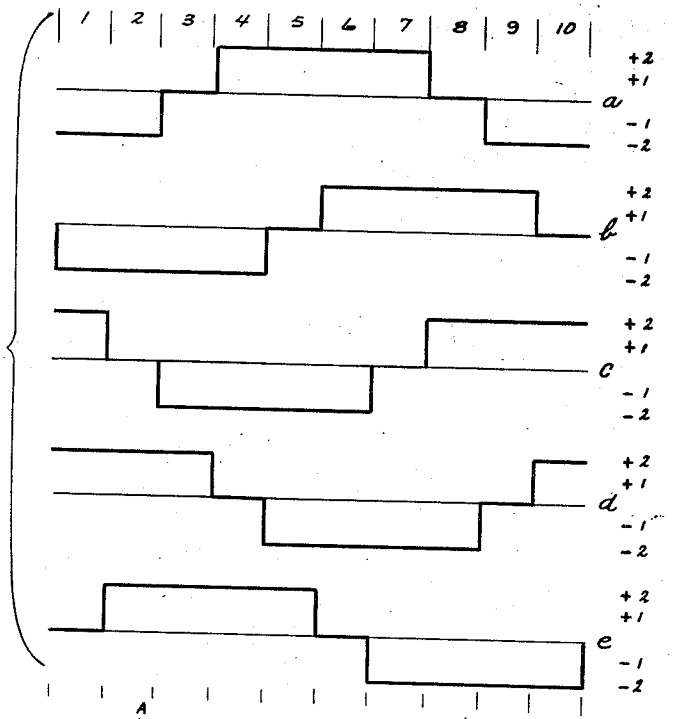
Figure 10:
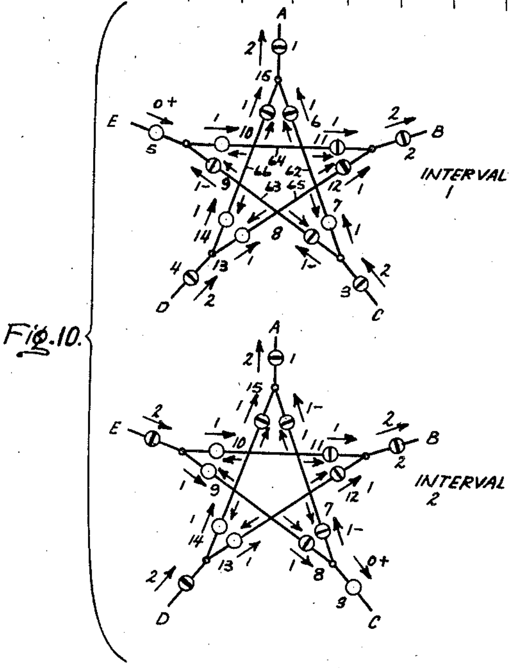
Figure 11:
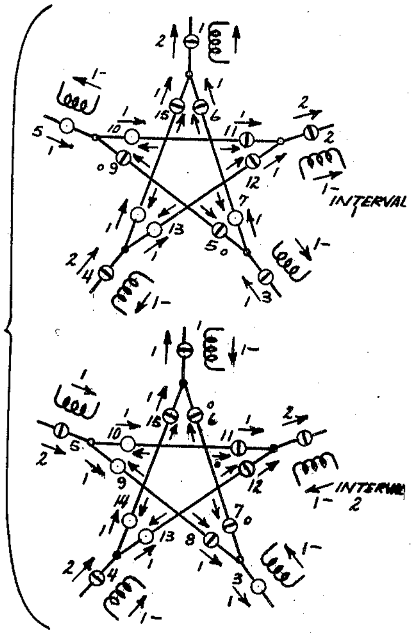
Figures 12, 13, 14, 15, 16:
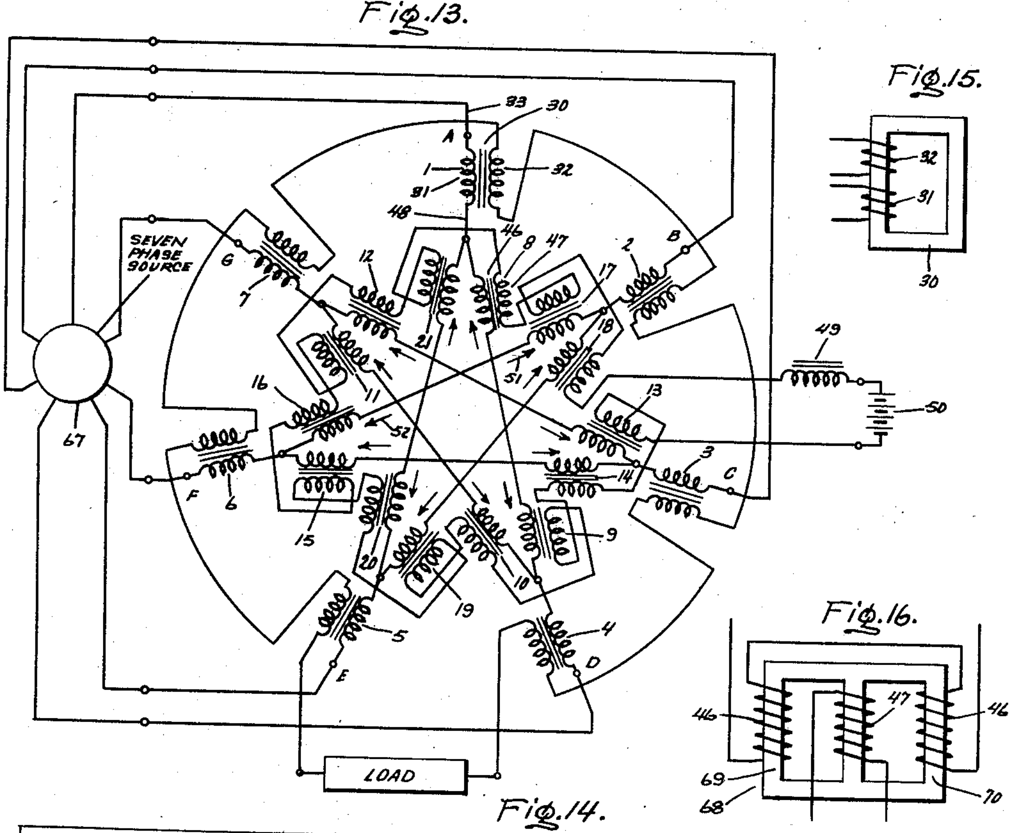

Figs. 3*a*, 3*b*, and 3*c* show the currents flowing in the alternating current windings of the output reactors during a complete cycle of operation;

Fig. 4 is a diagrammatic illustration showing the magnitude of the currents flowing and the saturated or unsaturated condition of the output and current limiting reactors during each 60° interval of the voltage impressed on the system of Fig. 1 with no load current being drawn;

Fig. 5 is an illustration similar to Fig. 4 showing the same relationships with maximum load current being drawn;

Fig. 6 is a chart showing the output reactors, the output voltage, the current limiter reactors, and the load limit reactors which are effective during each 60° interval of the voltage impressed on the system of Fig. 1;

Fig. 7 is a schematic illustration of a static magnetic frequency multiplier incorporating my invention for converting a five phase source of alternating current into a single phase alternating current having a frequency five times the input frequency;

Fig. 8 shows the phase relationships of the input and output voltages of the multiplier of Fig. 7 at no-load operation;

Fig. 9 shows the polarity and magnitude of the currents flowing in the alternating current windings of the output reactors during a complete cycle of no-load operation;

Fig. 10 displays two diagrams similar in nature to Fig. 4 showing the direction and magnitude of the current flow and the saturated or unsaturated condition of the various reactors of the circuit of Fig. 8 during the first two 36° intervals of operation with no load current flowing;

Fig. 11 is similar to Fig. 10 and shows the direction and magnitude of the current flow and the saturated or unsaturated condition of the reactors of the circuit of Fig. 7 during the first two 36° intervals of operation with maximum load current flowing;

Fig. 12 is a chart similar to the chart of Fig. 6 showing the output reactors, output voltages, current limiting reactors and load limiting reactors which are effective during each 36° interval of operation of the circuit of Fig. 7;

Fig. 13 is a schematic illustration of a further embodiment of my invention for converting a seven phase source of alternating current to a single phase alternating current having 7 times the input frequency;

Fig. 14 is a chart similar to the charts of Fig. 6 and 12 as applied to the circuit of Fig. 13;

Fig. 15 shows one form of reactor which may be used for the output and current limiting reactors of any of the circuits of this invention; and Fig. 16 shows an alternative form of current limiting reactor which may be used in any of the circuits of this invention.

Referring now to Fig. 1 of the drawings, the improved tripler circuit of my invention comprises three unbiased output saturable core reactors 1, 2, 3, respectively each having a suitable magnetic core 30 with a primary winding 31 and an output winding 32 disposed thereon. The outer ends 33 of each of the primary windings 31 of the output saturable core reactors 1, 2, and 3 are respectively connected to phase conductors 34, 35, and 36 which are in turn connected to input terminals 37, 38, and 39. The input terminals 37, 38, and 39 are adapted to be connected to a suitable three phase source of alternating current shown schematically at 40. For purposes of explanation of the mode of operation of the circuit of Fig. 1, the three phases of the three phase source 40 are designated A, B, and C as shown in Fig. 1.

An internal neutral network 41 is provided formed of three biased current limiting saturable core reactor circuits 42, 43, and 44. The circuit 42 is formed of two current limiting saturable core reactors 4 and 5, the circuit 43 is likewise formed of two current limiting saturable core reactors 6 and 7 and the current limiting circuit 44 is likewise formed of two current limiting saturable core reactors 8 and 9. Each of the current limiting saturable core reactors 4 through 9 is provided with a suitable core 45 formed of magnetic material with an alternating current winding 46 and a direct current bias winding 47 disposed thereon. The alternating current windings 46 of each of the current limiting saturable core reactor circuits 42 through 44 are serially connected across the other ends 48 of the alternating current windings 31 of the output saturable core reactors 1 through 3, this connection in the case of the circuit of Fig. 1 forming a delta which is considered to be the simplest form of star-polygon.

The direct current bias windings 37 of the current limiting saturable core reactors 4 through 9 are serially connected as shown with a suitable choke 49 for energization from a suitable source of direct current, such as battery 50. It will be observed that the direct current bias windings 47 of each current limiting saturable core reactor circuit 42 through 44 are oppositely connected so that each pair of current limiting saturable core reactors 4 and 5, 6 and 7, and 8 and 9, are biased in opposite directions as shown by the arrows 51 and 52.

It will be observed that the output windings 32 of the output saturable core reactors 1 through 3 are likewise serially connected across output terminals 53 and 54 to which a suitable load 55 may be connected.

In describing the mode of operation of the circuit of Fig. 1, certain assumptions must be set forth. It will first be assumed that the primary and the output windings 31 and 32 of the output saturable core reactors 1 through 3 have a 1 to 1 turns ratio relationship although it will be readily apparent that a step-up or step-down turns relationship may be provided. It will also be assumed that the alternating current windings 46 and the direct current bias windings 47 of the current limiting saturable core reactors 4 through 9 have a 1 to 1 turns relationship and that the cores 30 and 45 of the output saturable core reactors 1 through 3 and current limiting saturable core reactors 4 through 9 are formed of sharply saturating core material having a substantially square dynamic hysteresis loop. It must also be remembered that the current limiting saturable core reactors 4 through 9 when in their unsaturated condition are analagous to a transformer and perform in the same manner, i.e., the ampere turns in the secondary winding must be equal to the ampere turns in the primary winding. Thus, with the assumed 1 to 1 turns ratio relationship of the D.C. bias windings 47 and the alternating current windings 46 of the current limiting saturable core reactors 4 through 9, with one unit of bias current flowing in the bias windings 47, no more than one unit of current may flow in the alternating current windings 46.

Referring now additionally, to Figs. 2 and 3, in Fig. 2 there is shown the phase relationship of the phase voltages, i.e., the voltages from the phase conductors 34, 35, and 36 to the system neutral identified respectively as the VA–0, VB–0, and VC–0. Considering initially the first interval at which point the phase A voltage has passed through zero and is increasing, since with no load current flowing, the circuit of Fig. 1 is largely inductive, the phase A current would be expected to be lagging the phase A voltage by 90° and thus to have just passed maximum negative going positive. It will also be recalled that current flowing instantaneously in phase A must divide between the other two phases B and C and it will be observed by reference to Fig. 2, that during interval 1 the phase B voltage is going through its maximum negative condition so that it would be anticipated that the phase B current would be going through zero in the negative direction, and that the phase C voltage has just passed its maximum positive point going in the negative direction so that the phase C current would be expected to have gone through zero and be going positive. The output reactors 1 through 3 are designed so that they will saturate at a relatively low current flow through their alternating current windings 31 and it is of course well known that when saturated, the impedance of a reactor is very low while in its unsaturated condition, its impedance may be very high. Assuming now that one unit of bias current is flowing so that a maximum of one unit of current can flow in the alternating current windings 46 of the current limiting saturable core reactors 4 through 9, it will be seen that no more than two units of phase current can flow in any of the primary windings 31 of the output reactors 1 through 3.

Thus during interval 1, the phase A current is maximum negative tending to go in the positive direction and the core 30 of output reactor 1 has been driven well into saturation so that the impedance of primary winding 31 is very low and thus the phase current would normally be extremely high. However, by virtue of the one unit of bias current in the current limiting reactors, the current flow in winding 31 is limited to two units negative as shown in Fig. 3A; in this discussion negative phase current is assumed to be current flowing outward from the center of the internal neutral network. The phase B current as indicated above was found to be zero and the phase C current which has just gone through zero in the positive direction will rise to the plus two unit level following the saturation of core 30 of output reactor 3 as shown in Fig. 3C. Since the output reactor 1 is saturated and thus has low impedance, the current will tend to continue to flow in the alternating current winding 31 so long as there is applied voltage to sustain it. The current in phase B is seen to be zero while the output reactor 2 is unsaturated and has a high impedance. At the end of the first 30° interval of applied voltage, the volt-seconds rating of output reactor 2 will be consumed, the applied voltage saturating reactor 2, and current is permitted to flow in phase B in the anticipated negative direction the current being of course limited to two units. The flow of two units of current in phase B with two units of current continuing to flow in phase C deprives phase A of current. A simultaneous reversal in polarity of the voltage applied to reactor 1 causes reactor 1 to go out of saturation and current ceases to flow in phase A slightly in advance of the time that it would normally (in an unbiased circuit) be expected to pass through zero.

We thus find that zero current is flowing in phase A and output reactor 1 is unsaturated, two units of negative current is flowing in phase B with reactor 2 saturated in the negative direction, and two units of positive phase current continues to flow in phase C with reactor 3 continuing to be saturated in the positive direction. At the end of interval 2, the volt-seconds rating of reactor 1 is consumed and reactor 1 goes into saturation in the positive direction. A simultaneous reversal in polarity of the voltage applied to reactor 3 brings reactor 3 out of saturation. The two units of current previously flowing in reactor 3 are thus transferred to reactor 1 so that zero current flows in phase C, two units positive flow in phase A and two units negative current continue to flow in phase B.

By continuing this analogy throughout each 60° interval of a complete cycle of applied voltage, it will be seen that reactor 1 in phase A goes from saturation in the negative direction to saturation in the position direction during interval 2 and reverses in interval 5, i.e., from saturation in the positive direction to saturation in the negative direction. Likewise, reactor 2 in phase B goes from saturation in the positive direction to saturation in the negative direction in interval 1, and from saturation in the negative direction to saturation in the positive direction in interval 4. Reactor 3 in phase C goes from saturation in the positive direction to saturation in the negative direction in interval 3 and reverses itself in interval 6.

It is thus seen that the output reactors 1 through 3 are sequentially switched from saturation in one direction to saturation in the other direction and that at any given instant, only one of the three output reactors 1 through 3 inclusive is in an unsaturated condition.

Referring now to Fig. 4, the current flow in and the saturated or unsaturated condition of the current limiting reactors will be explored. In the diagrams of Figs. 4 and 5, the output and current limiting reactors are indicated by circles, a line through a respective circle indicating that the particular reactor is in its saturated condition whereas a blank circle indicates that the reactor is unsaturated. Consider now interval 1, in which it was seen that reactor 1 was saturated with two units negative phase current flowing, that reactor 2 was unsaturated with no phase current flowing and reactor 3 saturated with two units of positive current flowing. Under these conditions, the two units of phase current flowing in phase C will divide equally between current limiting circuits 43 and 44 so that one unit flows in each circuit. This one unit of current in the current limiting circuit 43 opposes the one unit of bias current in current limiting reactor 7 thus causing reactor 7 to be unsaturated whereas it aids the one unit of bias current flowing in reactor 6 so that reactor 6 is saturated. Likewise, the one unit of current flowing in the current limiting circuit 44 opposes the one unit of bias current in current limiting reactor 8 thus causing reactor 8 to be unsaturated and contrariwise aids the one unit of bias current flowing in reactor 9 causing reactor 9 to be saturated. It would be anticipated that one unit of current flowing in the current limiting saturable core reactor circuit 43 would likewise flow in the current limiting reactor circuit 42 to join with the one unit of current flowing in the circuit 44 to form the two units of negative current flowing in phase A through reactor 1. However, a small amount of negative magnetizing current will, in fact, flow in reactor 2 in phase *b* and since no more than one unit of current can flow in circuit 43 including reactors 6 and 7, the small amount of current flowing in phase B will deprive circuit 42 comprising current limiting reactors 4 and 5 of that amount of current. Thus, a current flows in circuit 42 slightly less than one unit in magnitude, this current aiding the one unit of bias current in reactor 4 causing reactor 4 to be saturated but, since it is slightly less than one unit, is not sufficient to desaturate reactor 5 so that reactor 5 may remain saturated under the influence of the one unit of bias current.

It will now be seen that between phases A and B, reactors 1, 4, and 5 are saturated and output reactor 2 is desaturated and thus provides the only high impedance element across phases A and B. Reactor 2 is thus said to "support" the voltage across phases A and B and since it is unsaturated, the voltage appearing across phases A and B will be induced by transformer action in the output winding 1; the voltage appearing across phases A and B is the vector sum of the phase A and phase B to neutral voltages. Thus, with reference to Fig. 2, it is seen that at the beginning of interval 1 when the phase A voltage is zero, the phase B voltage is negative and thus the voltage induced in the output winding 32 of reactor 2 is equal to the phase B voltage. As the phase A voltage increases, that voltage is added to the phase B voltage across primary winding 31 of reactor 2 thus by transformer action inducing substantially the same voltage in the output winding 32 so that at the end of interval 1 the voltage induced in the circuit of the output windings is increased as shown in solid lines in Fig. 2. It is thus seen at interval 1, reactor 2 is the output reactor, the output voltage is that appearing between the A and B phases and reactor 7 and 8 constitute the current limit reactors since, being unsaturated and being respectively arranged in current limiting circuits 43 and 44, they limit the current in those two circuits to the level of the bias current, i.e., one unit in present illustrative example.

At the end of interval 1, it was seen that reactor 1 in phase A became unsaturated while reactor 2 in phase B went into negative saturation and that reactor 3 in phase C remained in positive saturation. Thus referring to interval 2 of Fig. 4, it is seen that nearly two units of positive current continues to flow in phase C, two units of negative current is now flowing in phase B with reactor 2 saturated and only a minute quantity of positive magnetizing current is flowing in phase A with reactor 1 unsaturated. The two units of positive current flowing in phase C divide between current limiting circuits 43 and 44 with one unit of current flowing in circuit 43 opposing the bias current and thus desaturating current limiting reactor 7 and aiding the bias current and thus saturating reactor 6. One unit of current would be expected to flow in current limiting circuit 44 however the small positive current flowing in phase A cannot be added to the one unit of current flowing in circuit 42 so it must detract from the one unit of current expected to flow in circuit 44 so that something less than one unit of current actually flows in reactors 8 and 9. As in the case of interval 1, this current aids the bias in reactor 9 but is not sufficient to permit reactor 8 to be desaturated. The one unit of current flowing in circuit 42 will oppose the bias in reactor 4 thus permitting it to be desaturated and aid the bias in reactor 5 which remains saturated. It is now seen that reactor 1 is unsaturated and since reactors 3, 8, and 9 are saturated, reactor 1 in phase A supports the voltage appearing across phases A and C and thus, as in the case of reactor 2 in interval 1, by transformer action induces a voltage in its output winding 32 which is the vector sum of the phase A and phase C to neutral voltages as shown in solid lines in Fig. 2. In interval 2, it is therefore seen that reactor 1 is the output reactor, the output voltage is the voltage of phases A to C, and reactors 4 and 7 are the current limiting reactors.

The analysis of the direction of the current flow and the saturated or unsaturated condition of the various reactors in the remaining 60° intervals, 3 through 6 is made in exactly the same manner with reference to Figs. 3A, 3B, and 3C and the result is shown in intervals 3 through 6 of Fig. 4 with the output reactors, output voltages and current limit reactors effective in each interval determined in this manner being shown in the chart of Fig. 6.

Referring now to Fig. 5, the condition in which one unit of unity power factor load current is being drawn will be considered. It will be recalled from Fig. 2 that in the first interval, the output voltage is negative and therefore with a resistive load drawing unity power factor load current, the load current will be in phase with the output voltage and thus also negative during the first interval. The small quantity of magnetizing current flowing in the unsaturated load reactor 2 was seen to be negative, recalling the convention of depicting negative phase current as that flowing away from the center of the delta, and since under the condition of load current flowing and with reactor 2 unsaturated, the ampere turns of the secondary output winding must be equal and opposite to the ampere turns of the primary or alternating current winding, it is seen that the one unit of load current flowing in the output winding 32 of output reactor 2 must be shown as flowing in a direction toward the center of the delta as indicated by the arrows in Fig. 1. Since the output windings 32 of the output reactors 1, 2, and 3 are serially connected, the same load current will flow in all reactors and thus it is observed that the one unit of load current flowing in reactor 3 in phase C will aid the previous two units of phase current flowing in the same reactor and that reactor 3 will thus remain saturated. The one unit of load current flowing in output winding 32 of the active output reactor 2 during interval 1 must be balanced by one unit of phase current in the negative direction. This one unit of phase current is provided by the current limiting circuit 43 including current limiting reactors 6 and 7 and thus no current is now available for the current limiting circuit 42 including current limiting reactors 4 and 5. This deprives output reactor 1 of one unit of phase current and thus a net one unit of phase current flows in alternating current winding of reactor 1 as shown. By virtue of the one unit of current flowing in current limit reactor circuit 43 in the direction shown, current limit reactor 7 will remain unsaturated and current limit reactor 6 will remain saturated. Likewise, by virtue of the one unit of current flowing in current limit circuit 44, reactor 8 will remain unsaturated and reactor 9 will remain saturated. Since no current is flowing in current limit circuit 42, current limit reactors 4 and 5 will remain in their saturated condition under the influence of their respective bias currents. It will now be seen that so long as the load current is some value less than one unit, it will not balance out the one unit of phase current in reactor 1 and reactor 1 will remain saturated. However, if the load current reaches one unit, it will be seen that it will balance out the one unit of phase current in reactor 1 thus permitting reactor 1 to become desaturated. It will now be seen that under these conditions, there will be two unsaturated reactors spanning phases A and B, i.e., output reactors 1 and 2 and that the resultant output voltage will suffer a substantial reduction. It is therefore seen that the circuit of Fig. 1 provides a self limiting action, i.e., if an attempt is made to draw load current exceeding the bias current, the circuit will in essence shed the load by virtue of the sudden reduction in output voltage. It is therefore seen that in interval 1, reactor 1 acts as the load limit reactor as indicated in Fig. 6. The same method of analysis may be followed for intervals 2 through 6 of Fig. 5 and the effective load limit reactors during each interval are indicated in the chart of Fig. 6. Referring again to Figs. 3A, 3B, and 3C, the resultant phase currents with the unity power factor load current approaching one unit are shown in dotted lines whereas the phase currents under the no load condition are shown in solid lines.

A circuit has been constructed and tested in accordance with Fig. 1. This circuit is operated from a three phase 202 volt (line-line) 60 cycle source. For each output reactor 1 through 3, two identical reactors were connected in series (primary in series with primary; secondary in series with secondary) to give the desired volt-second rating. The use of two reactors instead of one for each phase was a matter of convenience and does not alter the mode of operation of the circuit. Each of said identical reactors had rectangular type cores 30, of the type shown in Fig. 15, having a stack height of 1⅛ inches, a length of 8 inches and a width of 3¼ inches, and with their side and end legs being respectively 1 and 2 inches wide. The primary winding was comprised of two coils connected in parallel, each having 129 turns of .0763 inch diameter wire. The output winding was comprised of two coils connected in series, each having 208 turns of .0427 inch diameter wire. The cores 30 of these reactors were formed of grain-oriented silicon steel (SX-10) which has a reasonably rectangular dynamic hysteresis loop. The current limit reactors 4 through 9 likewise had rectangular cores 45 of the type shown in Fig. 15 with a stack height of 1¹⁄₁₆ inches, a length of 8 inches, a width of 3¼ inches, and with their side and end legs being respectively 1 and 2 inches wide. Here the alternating current winding of each reactor 46 was comprised of two coils connected in parallel, each coil having 82 turns of .0808 inch diameter wire. The direct current winding was comprised of two coils connected in series, each coil having 274 turns of .0403 inch diameter wire. The choke 49 was designed for .91 henry at 2.0 amperes of direct current and the source of direct current bias voltage 50 provided 1.0 amp. of bias current. It has been found that the circuit of Fig. 1 and the other circuits in accordance with my invention perform more satisfactory with a slightly leading load current, but initial tests employed a totally resistive load. Thus at a load current of 1.73 amperes R.M.S., a 180 cycle output voltage of 530 volts R.M.S. was provided. This circuit was found to have an actual rating factor of 5.4.

Referring now to Fig. 7 which shows the application of my circuit to a five phase source of power and providing an output frequency five times the input frequency, for purposes of simplicity and understanding the mode of operation which is substantially identical with that of the circuit of Fig. 1, the output reactors have here been numbered from 1 to 5, the input phases have been designated A through E, and the current limiting reactors have been designated from 6 to 15.

Here, with like reference numerals above 30 again indicating like parts, each of the output reactors 1 through 5 has a core 30 in which alternating current windings 31 and output windings 32 are arranged. The ends 33 of the alternating current windings 31 of the output reactors 1 through 5 are respectively connected through phase conductors 51, 52, 53, 54, and 55 of phases A through E which in turn are respectively connected to input terminals 56 through 60. The input terminals are in turn adapted to be connected to a suitable five phase source of alternating current 61, which may be provided as is well known in the art by a suitable combination of Scott–T transformer connections. The output windings 32 are serially connected across output terminals 71 and 72 to which load 73 is again adapted to be connected.

In the quintupler circuit of Fig. 7, five current limiting saturable core reactor circuits 62 through 66 are provided respectively including current limiting saturable core reactors 6 and 7, 8 and 9, 10 and 11, 12 and 13, and 14 and 15. Each of the current limiting saturable core reactors 6 through 15 again has a core 45 provided with alternating current winding 46 and a direct current bias winding 47 disposed thereon. The alternating current windings 46 of each pair of current limiting saturable core reactors in each current limiting reactor circuit respectively are serial connected as shown, i.e., the alternating current windings 46 of reactors 6 and 7, 8 and 9, 10 and 11, 12 and 13, and 14 and 15, across the respective other ends 48 of the alternating current windings 31 of the output reactors 1 through 5 to form a star-polygon configuration. (The delta configuration of the current limiting saturable core reactor circuits of Fig. 1 is considered to be the simplest form of a star-polygon). The direct current bias windings 47 are again serially connected with a suitable choke 49 across a suitable source of direct current bias voltage, such as battery 50, with the connections of each pair of bias windings in each of a current limiting saturable core reactor circuits being reversed so that each pair of current limiting reactors is oppositely biased as shown by the arrows 74 and 75.

Referring now additionally to Figs. 8 and 9, the phase relationship of the phase to neutral voltages of the source 61 is shown in Fig. 8, the five phase to neutral voltages being designated V*a*–0, V*b*–0, V*c*–0, V*d*–0, and V*e*–0. Likewise, in the manner of Figs. 3A through 3C, Figs. 9A through 9E show the magnitude and phase relation of the phase currents flowing in the alternating current windings 31 of the output reactors 1 through 5 during a complete cycle of operation at no load. Referring to interval 1 of Figs. 8 and 9, it will be seen that the phase A voltage has just passed through zero going positive and thus the phase A current is a maximum negative. In common with the circuit of Fig. 1, this phase current will be held to a definite level by virtue of the bias current flowing in the current limiting reactor circuits and in the present case, the bias current is assumed to be one unit, and unity turns ratios are assumed for output and current limit reactors so that the phase current, as will shortly be apparent, will be limited to two units. During interval 1 the phase B current will be two units negative, the phase C current will be two units positive, the phase D current will be two units positive and the phase E current will be zero. It is seen that again the output reactors 1 through 5 are so arranged that all except one will be instantaneously saturated and carrying phase current in its alternating current winding 31 and that the output reactors are sequentlly switched from saturation in one direction to saturation in the other direction throughout the cycle.

Considering now Fig. 10 and assuming one unit of bias current and thus the phase currents indicated during interval 1 of Fig. 9, it is seen that two negative units of phase current are flowing in reactor 1 in phase A with that reactor saturated. Likewise two negative units of phase current are flowing in phase B with reactor 2 saturated. Two units of positive phase current are flowing in phases C and D with reactors 3 and 4 saturated and no current with the exception of a small quantity of positive magnetizing current is flowing in phase E with reactor 5 unsaturated. Considering first the two units of positive current flowing in phase C, this current must divide between current limiting saturable core reactors 63 and 62 since neither of these circuits will pass more than one unit of current and it is thus seen that one unit of current flows in circuit 62 which opposes the bias in reactor 7 thus permitting reactor 7 to be unsaturated and aids the bias in reactor 6 holding that reactor in saturation as shown. The small quantity of positive magnetizing current flowing in phase E and reactor 5 detracts from the maximum of one unit of current which would flow in circuit 63 and thus while the one minus unit of current flowing in reactor 9 aids the bias in reactor 9, this current is insufficient to permit desaturation of reactor 8 and thus reactor 8 remains saturated under the influence of its one unit of bias current. The two units of phase current flowing in phase D provide between circuit 65 and 66 with one unit in circuit 65 opposing the bias in reactor 13 thus permitting desaturation of that reactor and aiding the bias in reactor 12. The one unit of current flowing in circuit 66 likewise opposes the bias in reactor 14 and aids the bias in reactor 15 thus permitting desaturation of reactor 14. It is now seen that the one unit of current flowing in circuits 62 and 66 provide the two units of negative current flowing in phase A and reactor 1. The one unit of current (minus the small quantity of magnetizing current in phase E) which flows in circuit 63 returns as one complete unit of current in circuit 64 opposing the bias in reactor 10 and aiding the bias in reactor 11 thus permitting desaturation of reactor 10. It is thus seen that the two units of current flowing in phase B in reactor 2 are provided by the one unit flowing in circuit 65 and the one unit flowing in circuit 64.

It will now be seen that the active output reactor 5 in interval 1 spans phases E and C and supports the voltage across these phases since the remaining reactors in circuit across phases E and C namely 3, 8, and 9 are saturated. It will further be seen that there is one unsaturated reactor effective in each of the remaining current limiting circuits, namely 7, 13, 14, and 10 to support the voltages across the remaining phases. Thus, in the manner of the circuit of Fig. 1, the voltage appearing across phases E and C during the first interval is induced by transformer action in the output or secondary winding 32 of output reactor 5 as shown in Fig. 8.

During interval 2, reference to Fig. 9 will show that the phase A current remains two units negative, the phase B current is still two units negative, the phase C current has gone to zero, the phase D current remains at two units positive, and the phase E current has gone to two units positive. Following the same analysis as in the case of interval 1, it will be seen that output reactor 3 is now the unsaturated reactor and that it spans phases A and C and thus supports the voltage across phases A and C. This same analogy can be continued for the ten 36° intervals of Figs. 8 and 9 in the manner of Fig. 4 and the chart of Fig. 12 records the effective output reactors, output voltages, and current limit reactors for each of the ten intervals.

Considering now the condition of one minus unit (i.e., just under one unit) of unity power factor load current as shown in Fig. 11, it will again be seen that the one minus unit of phase current which must now flow in the positive direction in phase E and reactor 5 by virtue of the one minus unit of positive load current flowing in reactor 5, will be subtracted from the two units of phase current formerly flowing in phase C and reactor 3 and that therefore if the load current reaches one unit, it will permit desaturation of reactor 3 thereby reducing the output voltage. The chart of Fig. 12 therefore likewise records the load limit reactors which are effective during each interval to limit the load current to an amount of more than the bias current.

A quintupler circuit as shown in Fig. 7 has been constructed and operated from a five phase source of 148 volt (line-line) 60 cycle voltage provided by a three phase to five phase transformer drawing power from a three phase line. Here, the output reactors 1 through 5 again are provided with rectangular cores having a stack height of 1.02 inches, a length of 6 inches, a width of 2⁷⁄₁₆ inches with the side and end legs being respectively ¾ and 1½ inches wide. The primary winding was comprised of two coils connected in series, each having 123 turns of .0641 inch diameter wire. The output winding was comprised of two coils connected in series, each having 304 turns of .0339 inch diameter wire. The current limiting reactors of each circuit were formed by butting two rectangular reactors each having a stack height of .85 inch, a length of 5 inches and a width of 2¹⁄₃₂ inches with the side and end legs being respectively ⅝ and 1¼ inches wide to in essence form a core configuration of the type shown in Fig. 16. With this arrangement, a common bias winding was provided for both reactors of each circuit having 318 turns of .0403 inch diameter wire while the alternating current windings 46 were each provided with 318 turns of .0403 inch diameter wire. In this circuit, 2 amperes direct current was supplied to the direct current windings through a suitable choke. This arrangement provided a 300 cycle output voltage of 600 volts across a resistance load drawing .64 ampere with a 1.0 microfarad capacitor connected in series with the load.

Reference to the above description and Figs. 1 and 7 will now make it readily apparent that the current limiting saturable core reactor circuits each include a pair of current limiting saturable core reactors which are oppositely biased, the current limiting circuits each joining the inner ends of two output reactor alternating current windings and respectively spanning the phases across which appear the voltages which are sequentially supported by the output reactors.

The provision of output reactors equal in number to the number of input phases with their alternating current windings respectively having one end connected to the phase conductors of the source and with an internal neutral network connecting the inner ends of the alternating current windings of the output reactors, the neutral network comprising a plurality of current limiting saturable core reactor circuits equal in number to the number of phases of the source and each having two oppositely biased current limiting saturable core reactors, can be expanded to higher odd numbers of phases such as 7 as shown in Fig. 13. Here again, for simplicity in analyzing, the output reactors have been designated 1 through 7 and the current limiting reactors in this case 8 through 21. Here again, each output reactor has a core 30 provided with an alternating current or primary winding 31 and an output or secondary winding 32, the primary windings 31 having their outer ends 33 respectively connected to the phase conductors of the seven phase source 67 designated A through G. The inner ends 48 of the alternating current windings 31 of the output saturable core reactor 1 through 7 are connected by a neutral network comprising seven current limiting saturable core reactor circuits formed of current limiting saturable core reactors 8 and 9, 10 and 11, 12 and 13, 14 and 15, 16 and 17, 18 and 19, and 20 and 21 with the alternating current windings 46 of each pair of current limiting saturable core reactors being serially connected in a star-polygon configuration. The direct current bias windings 47 of the current limiting saturable core reactors are again serially connected with choke 49 and a suitable source of direct current bias voltage, such as battery 50 with the bias windings of each pair of bias windings being oppositely connected so that each current limiting saturable core reactor circuit has its reactors oppositely biased as shown by the arrows 51 and 52.

The mode of operation of the seven phase multiplier of Fig. 13 may be analysed in the same manner as the circuits of Figs. 1 and 7 and the chart of Fig. 14 indicates the active output reactors, output voltages, current limiting reactors and load limiting reactors for each of the fourteen intervals of a complete cycle of operation.

As indicated previously, the output reactors of each of the Figs. 1, 7, and 13 may be conventionally formed as shown in Fig. 15 with a rectangular shaped core 3 with the windings 31 and 32 positioned thereon as shown. The current limiting saturable core reactors of the Figures 1, 7, and 13 may likewise be formed as shown in Fig. 15, and also may be formed as shown in Fig. 16 with each pair of current limiting saturable core reactors being combined on a single three-legged core 68 with a single bias winding 47 and two alternating current windings 46. It will be readily seen that the flux provided by the direct current bias winding 47 will divide and traverse the two end legs 69 and 70 of the core 68 thereby oppositely biasing the two alternating current coils 46. Thus, the unitary core and coil construction of Fig. 16 may be readily substituted for each pair of current limiting saturable core reactors of each of the circuits of Figs. 1, 7 and 13, for example current limiting reactors 4 and 5 of circuit 42 of Fig. 1.

It will now be seen that I have provided a basic static magnetic frequency multiplier circuit applicable to any odd number of phases over three characterized by the fact that the multiplication is accomplished in a single stage and that the rating factor of the circuit is improved over previous circuits.

While I have illustrated and described specific embodiments in this invention, further modifications and improvements will occur to those skilled in the art and I desire that it be understood therefore that this invention is not limited to the particular form shown and I intend in the appended claims to cover all modifications which do not depart from the spirit and scope of this invention.

What I claim as new and desire to secure by Letters Patent of the United States is:

1. A static magnetic frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of said primary windings being respectively connected to phase conductors adapted to be respectively connected to the phases of said source, said output windings being serially connected and adapted to be connected across a single phase load; and an internal neutral network connecting the other end of said primary windings of said output reactor and comprising a plurality of biased current-limiting saturable core reactors.

2. A static magnetic frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of said primary windings being respectively connected to phase conductors adapted to be respectively connected to the phases of said source, said output windings being serially connected and adapted to be connected across a single phase load; and an internal neutral network connecting the other end of said primary windings of said output reactor and comprising a plurality of serially connected pairs of oppositely biased current limiting saturable core reactors.

3. A static magnetic frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of each of said primary windings being connected to a respective phase conductor, said phase conductors being adapted to be respectively connected to the phases of said source, said output windings being serially connected and adapted to be connected across a single phase load; an internal neutral network comprising a plurality of pairs of biased current limiting saturable core reactors equal in number to the number of said phases, each of said current limiting reactors having an alternating current winding and a direct current bias winding, said alternating current windings of each of said pairs of current limiting reactors being serially connected between the other ends of two of said output reactor primary windings; and circuit connections including a choke for impressing a direct current bias voltage on said bias windings, said bias windings of each of said pairs of current limiting reactors being connected to bias the respective current limiting reactors in opposite directions, said bias windings being arranged normally to saturate their respective cores.

4. A static multiplier frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of each of said primary windings being connected to a respective phase conductor, said phase conductor being adapted to be respectively connected to the phases of said source, said output windings being serially connected and adapted to be connected across a single phase load; and an internal neutral current limiting saturable core reactor network connecting the other ends of said output reactor primary windings; said output reactors being sequentially switched from saturation in one direction to saturation in the opposite direction responsive to current flow in the respective phase conductors with all except one of said output reactors being instantaneously saturated whereby a voltage at said multiplied frequency is induced in the circuit of said output windings; said neutral network comprising a plurality of pairs of current limiting saturable core reactors equal in number to the number of said phases and each such reactor having an alternating current winding and a direct current bias winding, the alternating windings of each of said pairs of current limiting reactors being serially connected across the other ends of two of said output reactor alternating current windings thereby respectively forming circuits with said output reactor alternating current windings spanning the phase conductors across which respectively appear the voltages supported by the respective primary windings of the desaturated output reactors; and circuit connections including a choke for impressing a direct current bias voltage on said bias windings, said bias windings of each of said pairs of current limiting reactors being connected to bias the respective current limiting reactors in opposite directions, said bias windings being arranged normally to saturate their respective cores.

5. A static magnetic frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of each of said primary windings being connected to a respective phase conductor, said phase conductors being adapted to be respectively connected to the phases of said source, said output windings being serially connected and adapted to be connected across a single phase load; an internal neutral network comprising a plurality of current limiting saturable core reactor circuits equal in number to the number of said phases and each having bias winding means and alternating current winding means aiding a part and opposing the remainder of said bias winding means, said alternating current winding means of each of said circuits being connected between the other ends of two of said output reactor primary windings; and circuit connections including a choke for impressing a direct current bias voltage on said bias winding means.

6. A static magnetic frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of each of said primary windings being connected to a respective phase conductor, said phase conductors being adapted to be respectively connected to the phases of said source, said output windings being serially connected and adapted to be connected across a single phase load; an internal neutral network comprising a plurality of current limiting saturable core reactor circuits equal in number to the number of said phases and each having bias winding means and alternating current winding means aiding a part and opposing the remainder of said bias winding means, said alternating current winding means of said circuits being connected between the other ends of said output reactor windings in a star-polygon configuration; and circuit connections including a choke for impressing a direct current bias voltage on said bias winding means.

7. A static magnetic frequency multiplier for converting a plural phase source of alternating current having an odd number of phases and a predetermined frequency to single phase alternating current having a frequency which is said predetermined frequency multiplied by the number of said phases, said multiplier comprising: a plurality of unbiased saturable core output reactors equal in number to the number of said phases and each having a primary winding and an output winding, one end of each of said primary windings being connected to a respective phase conductor, said phase conductors being adapted to be respectively connected to the phases of said source, said output windings being serially connected and adapted to be connected across a single phase load; and an internal neutral current limiting saturable core reactor network connecting the other ends of said output reactor primary windings; said output reactors being sequentially switched from saturation in one direction to saturation in the other direction responsive to current flow in the respective phase conductors with all except one of said output reactors being instantaneously saturated whereby a voltage at said multiplied frequency is induced in the circuit of said output windings: said neutral network comprising a plurality of pairs of current limiting saturable core reactors equal in number to the number of said phases and each having an alternating current winding and a direct current bias winding, the alternating current windings of each of said pairs of current limiting reactors being serially connected, said serially connected alternating current windings of said current limiting reactors being connected between the said other ends of said output reactor primary windings in a star-polygon configuration thereby respectively forming circuits with said primary windings of said output reactors spanning the phase conductors across which respectively appear the voltages supported by the respective primary windings of the desaturated output reactor; and circuit connections including a choke for impressing a direct current bias voltage on said bias windings, said bias windings of each of said pairs of current limiting reactors being connected to bias the respective current limiting reactors in opposite directions, said bias windings being arranged normally to saturate their respective cores.

8. A static magnetic frequency multiplier for converting a three phase source of alternating current having a predetermined frequency to single phase alternating current having a frequency three times said predetermined frequency, said multiplier comprising: three unbiased saturable core output reactors each having a primary winding and an output winding, one end of each of said primary windings being connected to a respective phase conductor, said phase conductors being adapted to be respectively connected to the phases of said source, said output windings being serially connected and adapted to be connected across a single phase load; an internal neutral network comprising three pairs of biased current limiting saturable core reactors, each of said current limiting reactors having an alternating current winding and a direct current bias winding, said alternating current windings of each of said pair of current limiting reactors being serially connected, said serially connected pairs of current limiting reactor alternating current windings being connected in delta between the other ends of said output reactor primary windings; and circuit connections including a choke for impressing a direct current bias voltage on said bias windings, said bias windings of each of said pairs of current limiting reactors being connected to bias the respective current limiting reactors in opposite directions, said bias windings being arranged normally to saturate their respective cores.

9. A static magnetic frequency multiplier for converting a five phase source of alternating current having a predetermined frequency to single phase alternating current having a frequency five times said predetermined frequency, said multiplier comprising: five unbiased saturable core output reactors each having a primary winding and an output winding, one end of each of said primary windings being connected to a respective phase conductor, said phase conductors being adapted to be respectively connected to the phases of said source, said output windings being serially connected and adapted to be connected across a single phase load; an internal neutral network comprising five pairs of biased current limiting saturable core reactors, each of said current limiting reactors having an alternating current winding and a direct current bias winding, said alternating current windings of each of said pair of current limiting reactors being serially connected, said serially connected pairs of current limiting reactor alternating current windings being connected in a star-polygon between the other ends of said output reactor primary windings; and circuit connections including a choke for impressing a direct current bias voltage on said bias windings, said bias windings of each of said pairs of current limiting reactors being connected to bias the respective current limiting reactors in opposite directions, said bias windings being arranged normally to saturate their respective cores.

10. A static magnetic frequency multiplier for converting a seven phase source of alternating current having a predetermined frequency to single phase alternating current having a frequency seven times said predetermined frequency, said multiplier comprising: seven unbiased saturable core output reactors each having a primary winding and an output winding, one end of each of said primary windings being connected to a respective phase conductor, said phase conductors being adapted to be respectively connected to the phases of said source, said output windings being serially connected and adapted to be connected across a single phase load; an internal neutral network comprising seven pairs of biased current limiting saturable core reactors, each of said current limiting reactors having an alternating current winding and a direct current bias winding, said alternating current windings of each of said pairs of current limiting reactors being serially connected, said serially connected pairs of current limiting reactor alternating current windings being connected in a star-polygon between the other ends of said output reactor primary windings; and circuit connections including a choke for impressing a direct current bias voltage on said bias windings, said bias windings of each of said pairs of current limiting reactors being connected to bias the respective current limiting reactors in opposite directions, said bias windings being arranged normally to saturate their respective cores.

References Cited in the file of this patent

UNITED STATES PATENTS

| | | |
|---|---|---|
| 1,269,011 | Shoenberg | June 11, 1918 |
| 2,437,093 | Huge | Mar. 2, 1948 |
| 2,473,999 | Jones | June 21, 1949 |
| 2,666,178 | Kramer | Jan. 12, 1954 |
| 2,820,942 | Depenbrock | Jan. 21, 1958 |

FOREIGN PATENTS

| | | |
|---|---|---|
| 372,998 | Germany | Apr. 6, 1923 |

UNITED STATES PATENT OFFICE

CERTIFICATE OF CORRECTION

Patent No. 2,892,142 June 23, 1959

Luther L. Genuit

It is hereby certified that error appears in the printed specification of the above numbered patent requiring correction and that the said Letters Patent should read as corrected below.

Column 13, line 42, for "static multiplier" read -- static magnetic --.

Signed and sealed this 18th day of October 1960.

(SEAL)
Attest:
KARL H. AXLINE
Attesting Officer

ROBERT C. WATSON
Commissioner of Patents